Patented Jan. 30, 1934

1,945,235

UNITED STATES PATENT OFFICE 1,945,235

PROCESS OF PREPARING A COLORLESS HOUSEHOLD INSECTICIDE

Nicholas A. Sankowsky, Elizabeth, and Dudley H. Grant, Moorestown, N. J., assignors to Stanco Incorporated No Drawing. Application July 2, 1928
Serial No. 290,030

4 Claims. (Cl. 167—24)

This invention relates to improvements in insecticides and has for its object the preparation of a colorless household insecticide containing the active insecticidal principle of pyrethrum (pyrethrins).

In the manufacture of pyrethrum extracts the practice has been to treat pyrethrum flowers with large volumes of kerosene or other solvents by percolation or centrifuging. Such methods yield an extract containing pyrethrins contaminated with substantial amounts of inert and colored extractives. It is desirable that the coloring material as well as the greater part of the fatty and waxy extractives be removed from the insecticidal extracts especially those manufactured for household uses. We have found that a practically colorless insecticide is obtained by purifying a concentrated pyrethrum extract by alternate treatment with alcohol and naphtha and dissolving the purified product in water white kerosene.

The concentrated extract of pyrethrum flowers is prepared by any suitable process using kerosene petroleum ether naphtha or a mixture of naphtha and chlorinated hydrocarbons as solvents. We prefer to use the extraction method of Nicholas A. Sankowsky disclosed in his U. S. patent application of April 23, 1928, Serial No. 272,100, according to which the solvent such as kerosene, alcohol is caused to flow over and through the substance to be extracted without flooding it. This method is used in preference to others because it yields a more concentrated and purer extract than that obtained by other processes. This extract may be further concentrated by distillation in vacuo or may be directly subjected to treatment with alcohol. The vacuum distillation is in most cases unnecessary.

The alcoholic treatment consists of agitating the extract with anhydrous methyl alcohol. Other anhydrous alcohol or a mixture of anhydrous alcohols may also be successfully used. The pyrethrins dissolve in the alcohol leaving most of the impurities in the naphtha or other solvent used for extraction. The alcoholic solution is chilled and filtered or centrifuged to remove further quantities of impurities and is then distilled, preferably in vacuo to leave a thick syrupy residue consisting largely of pyrethrins. If desired, this residue may be redissolved in naphtha, the solution filtered and then retreated with alcohol, the alcoholic solution being then chilled, filtered and distilled in vacuo again as already described. The alternate treatments with naphtha and alcohol are repeated several times, if so desired, to purify and concentrate the pyrethrins.

The syrupy residue is dissolved in kerosene or other suitable water white petroleum distillate with the optional addition of carbon tetrachloride, essential oils or other insecticides and repellents, the composition thus obtained forming a practically colorless solution suitable for use as a household insecticide by spraying or otherwise.

The following is a typical example: 6 gallons of concentrated kerosene pyrethrum extract were prepared by the extraction method of Sankowsky, representing a concentration of 10 parts of flowers to one part of extract. This concentrated kerosene pyrethrum extract was vigorously shaken with 5 successive lots of anhydrous methyl alcohol, 6 gallons each lot. The 30 gallons of alcoholic pyrethrum extract were united, chilled to 32° F. and centrifuged, whereby some coloring material was removed. The alcohol was then distilled off in vacuo, leaving 10 lbs. of a yellow, thick syrup, which was dissolved in 480 gallons of water white kerosene. This solution did not differ noticeably in color from the kerosene used and it represented a colorless insecticide of good quality.

The process can be modified in various ways. The first extraction of the pyrethrum flowers can be made, for instance, by isopropyl chloride, which is subsequently distilled off. The residual oleoresinous extract may be treated with naphtha or petroleum ether and the resulting extract again by alcohol. The naphtha and alcohol treatment may be repeated several times if a highly purified product is required. The alcoholic pyrethrum solution, besides being chilled and centrifuged, may be further purified by addition of decolorizing carbon and filtration.

In the subsequent claims the expression "strong solution of pyrethrins" is used to designate a solution containing the extracts of not substantially less than one part by weight of pyrethrum flowers to one part by weight of the solution.

It will be understood that the process is not limited by the particulars given but only by the following claims, in which it is our intention to claim all inherent novelty as broadly as the prior art permits.

I claim:

1. The process of preparing pyrethrum insecticide which comprises extracting pyrethrum flowers with kerosene to prepare a strong kerosene solution of pyrethrins, shaking the solution with anhydrous methyl alcohol to dissolve part of the kerosene extract of pyrethrum in the alcohol, cooling said alcohol to approximately 32° F. and centrifuging the same to remove dissolved impurities, distilling off the alcohol in vacuo to obtain as residue a purified extract containing the pyrethrins and dissolving said extract in water white kerosene.

2. The process according to claim 1 in which not substantially less than 10 parts by weight of pyrethrum flowers are used to obtain 1 part by weight of kerosene solution.

3. The process of manufacturing pyrethrum insecticide which comprises preparing a strong solution of pyrethrum extract in a light petroleum distillate, agitating the solution with an anhydrous alcohol to dissolve part of the pyrethrum extract in the alcohol, cooling the alcohol solution and removing the separated impurities, distilling off the alcohol to obtain as residue a purified extract containing the pyrethrins and dissolving said purified extract in water white kerosene.

4. The process of manufacturing pyrethrum insecticide which comprises preparing a strong solution of pyrethrum extract in a light petroleum distillate, agitating the solution with anhydrous methyl alcohol to dissolve part of the pyrethrum extract in the alcohol, separating the alcohol layer from the light hydrocarbon layer, cooling the alcohol solution and removing the separated impurities, distilling off the alcohol to obtain as residue a purified extract containing the pyrethrins, and dissolving said purified extract in water white kerosene.

NICHOLAS A. SANKOWSKY.
DUDLEY H. GRANT.